United States Patent [19]

Lasoen

[11] Patent Number: 4,790,213

[45] Date of Patent: Dec. 13, 1988

[54] PLANETARY GEAR ASSEMBLIES

[76] Inventor: Jean J. Lasoen, 4 Av des Pres Vendome, 78450 Villepreux, France

[21] Appl. No.: 563,417

[22] PCT Filed: Feb. 28, 1983

[86] PCT No.: PCT/EP83/00056

§ 371 Date: Oct. 28, 1983

§ 102(e) Date: Oct. 28, 1983

[87] PCT Pub. No.: WO83/03289

PCT Pub. Date: Sep. 29, 1983

[30] Foreign Application Priority Data

Mar. 11, 1982 [GB] United Kingdom ................. 8207134

[51] Int. Cl.$^4$ ............................................. F16H 37/04
[52] U.S. Cl. ........................................ 74/740; 74/791
[58] Field of Search ................. 74/740, 789, 790, 791, 74/325, 792

[56] References Cited

U.S. PATENT DOCUMENTS

| | | | |
|---|---|---|---|
| 1,712,956 | 5/1929 | Gustafson | 74/325 X |
| 1,954,200 | 4/1934 | Fromm | 74/792 |
| 2,228,617 | 1/1941 | Ware | 74/792 |
| 2,575,522 | 11/1951 | McFarland | 74/789 X |
| 2,959,987 | 11/1960 | Miller | 74/792 |
| 3,148,556 | 9/1964 | Gibbs et al. | 74/325 |
| 3,352,166 | 11/1967 | Marquart et al. | 74/789 X |
| 3,703,031 | 11/1972 | Fodrea | 29/469 |
| 3,774,474 | 11/1973 | Recker et al. | 74/740 |
| 3,774,475 | 11/1973 | Meysenburg et al. | 74/740 |

FOREIGN PATENT DOCUMENTS

| | | | |
|---|---|---|---|
| 491233 | 3/1953 | Canada | 74/325 |
| 677321 | 12/1929 | France | 74/789 |
| 2188522 | 1/1974 | France . | |
| 2427523 | 12/1979 | France . | |
| 357935 | 12/1961 | Switzerland | 74/791 |
| 307266 | 3/1929 | United Kingdom . | |
| 468273 | 7/1937 | United Kingdom | 74/325 |
| 1505242 | 3/1978 | United Kingdom . | |

Primary Examiner—Lawrence Staab
Assistant Examiner—Dwight G. Diehl

[57] ABSTRACT

A planetary gear assembly (10) having a stationary housing (18) and co-axial input and output shafts (12, 14) having the same diameter and spline formations of the same cross-sectional form on their adjacent end portions (12a, 14a). First and second sun gears (13, 15) are splined one onto each shaft end portion, a carrier (20) is rotatable about the axis of the input and output shafts, and planet gears (22, 23) carried by the carrier mesh with the sun gears. A brake (31) is provided to hold the carrier stationary so that the assembly operates in its planetary ratio. A clutch (27) is provided to clutch a torque transmitting member (24) which is splined onto either the input or output shaft to the carrier (20) to lock-up the assembly and provide a direct drive ratio. The arrangement allows either sun gear (13, 15) to be splined onto either the input or output shaft and the meshing planet gears to be located accordingly so that a given planetary gear assembly can be assembled to give either an overdrive or underdrive planetary ratio. The planetary ratio can be omitted if desired by joining the input and output shafts (12, 14) with an internally-splined sleeve (50).

2 Claims, 4 Drawing Sheets

PLANETARY GEAR ASSEMBLIES

TECHNICAL DISCLOSURE

This invention relates to planetary gear assemblies particularly, though not exclusively, for use in agricultural or industrial tractors.

Such assemblies are well known for use in the input or output stages of a tractor or similar vehicle to provide an overdrive or underdrive function. Examples of such assemblies are shown in UK Pat. No. 1430 962 and UK Patent Application No. 2046 853.

Previously if a vehicle manufacturer wished to offer an overdrive and underdrive option it has been necessary to provide overdrive and underdrive units which, whilst possibly containing a number of common parts, did require the provision of parts specifically for the overdrive unit and other parts specifically for the underdrive unit. This increases manufacturing costs and leads to a larger parts inventory.

DISCLOSURE OF THE INVENTION

It is an object of the present invention to provide an improved form of planetary gear assembly which, dependent on the manner in which the parts are assembled, can function as either an overdrive or underdrive unit.

According to the present invention there is provided a planetary gear assembly comprising co-axial input and output shafts having the same diameter and spline formations of the same cross-sectional form on their adjacent end portions, first and second sun gears splined one onto each shaft end portion, a carrier rotatable about the axis of the input and output shafts, planet gear means carried by the carrier and meshing with the first and second sun gears respectively, a stationery housing, brake means operable to hold the carrier stationery so that the assembly operates in its planetary ratio and clutch means operable to clutch one of the shafts to the carrier via a torque path not involving either sun gear in order to lock-up the assembly and provide a direct drive ratio, the arrangement allowing either sun gear to be splined onto either the input or ouptut shaft end portion and the meshing planet gear means to be located accordingly so that a given gear asssembly can be assembled to give either an overdrive or underdrive planetary ratio.

A planetary gear assembly in accordance with the present invention offers significant economies for the manufacturer since a single set of parts, by appropriate assembly, can form either a planetary overdrive or underdrive unit thus reducing the number of parts which must be produced and stocked.

In a preferred arrangement the torque path includes a torque transmitting member which is splined onto the input shaft end portion. This arrangement reduces the torque loading on the clutch means.

Preferably the brake and clutch means are of the liquidcooled type and are disposed generally radially one within the other so that the same radially outwardly flowing coolant can cool both the clutch and brake means.

As indicated above, the planetary gear assembly of the present invention will normally form part of a series arrangement of transmission elements which form a total vehicle transmission. The vehicle manufacturer may wish to offer the transmission without the planetary gear assembly of the present invention but still retaining the housing of the planetary gear assembly since this may, for example, support other components (e.g. other parts of the transmission) which are required in the vehicle although the customer does not require an overdrive or underdrive unit.

In such circumstances it is possible for the manufacturer to connect the splined input and output shaft end portions of the assembly of the present invention using a simple internally splined sleeve and to omit or remove the sun gears, carrier, planet gear means, brake means and clutch means and to simply and cheaply provide a transmission alternative without a planetary gear assembly.

The present invention thus also provides a vehicle transmission of the form described in the two preceding paragraphs in which the input and output shaft end portions are connected by an internally splined sleeve and also a method of converting a planetary gear assembly in accordance with the present invention into a straight-through assembly comprising removing the sun gears, carrier, planet gear means, brake means and clutch means and connecting the splined end portions of the input and output shafts by an internally-splined sleeve.

DESCRIPTION OF THE DRAWINGS

One embodiment of the present invention will now be described, by way of example only, with reference to the accompanying drawings in which.

BEST MODE OF CARRYING OUT INVENTION

Figure 1:
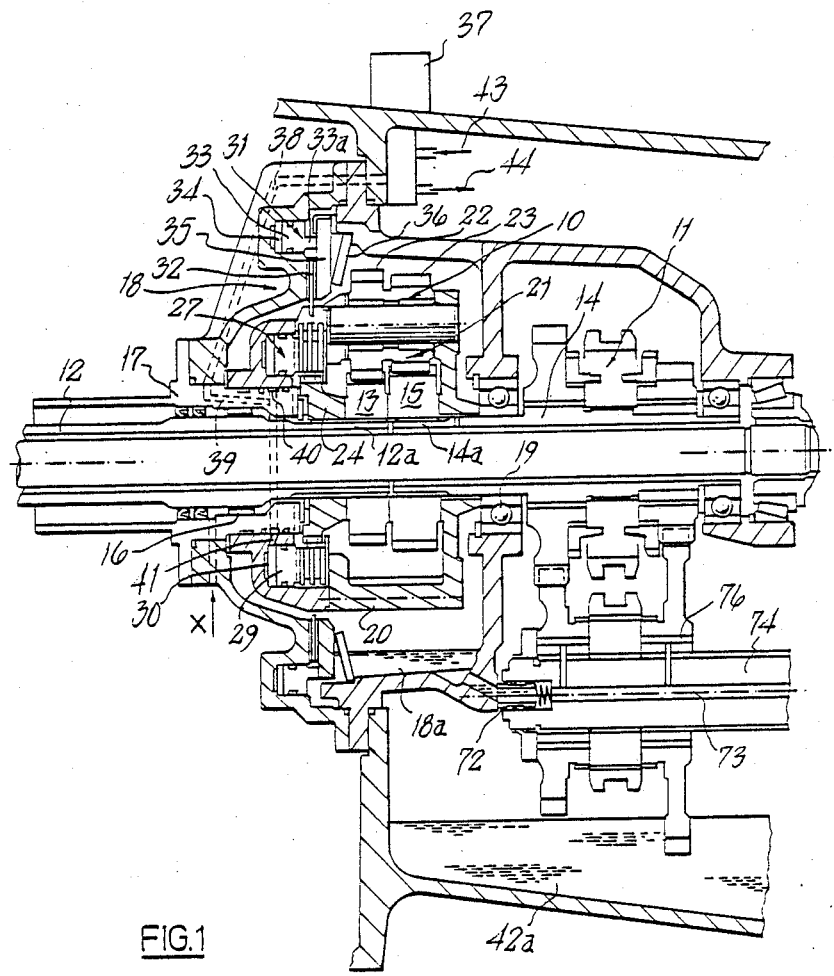
FIG. 1 is a vertical section through part of a tractor transmission embodying a planetary gear assembly of the present invention operating as an underdrive unit.

Refering to FIG. 1, the tractor transmission includes a planetary gear assembly 10 in accordance with the present invention in series with a change speed gear box part of which is shown at 11.

The planetary gear assembly 10 has an input shaft 12 having an end portion 12a on which is splined a first sun gear 13 and an output shaft 14 having an end portion 14a on which is splined a second sun gear 15. Input shaft 12 is supported via roller bearing 16 within a sleeve-like distributor member 17 which forms part of the housing 18 of the assembly 10. Output shaft 14, which acts as the input into change of speed gear box 11, is supported from housing 18 via bearing 19.

A carrier 20 is supported at one end on output shaft 14 and at the other end on distributor member 17. Carrier 20 carries planet gear means in form of a duplex planetary gear 21 having first and second gear teeth 22 and 23 for meshing engagement with sun gears 13 and 15 respectively.

A torque transmitting member 24 is also splined onto input shaft 12. A clutch means in the form of an hydraulically operated multiplate clutch 27 is provided to clutch torque transmitting member 24 to the carrier 20 to lock-up the assembly 10 via a torque path which includes member 24 and thus provide a direct drive ratio across the planetary assembly. Clutch 27 comprises a series of clutch discs 25 splined onto torque transmitting member 24 and an interleaved series of clutch discs 26 splined onto the carrier 20. The clutch is completed by an annular reaction number 28 which is splined onto the carrier and an annular piston 29 also carried by the carrier. The clutch is engaged by pressurising an annular chamber 30 using hydraulic fluid and is released by spring means not shown.

Brake means in the form an hydraulically operated annular brake 31 is provided to hold the carrier stationery so that the planetary gear assembly operates in its planetary ratio. The brake comprises of annular brake number 32 which is splined onto the carrier, an annular reaction number 35 which is splined onto the housing 18, a Belleville type spring member 36 which biases the reaction member against the brake number 32 to apply the brake, and an annular piston member 33 having an axially projecting ring portion 33a which contacts the reaction number 35 to release the brake when actuating chamber 34 is pressurised.

The admission of hydraulic pressure to clutch and brake actuating chambers 30 and 34 respectively is controlled by a solenoid operated valve 37. Passageway 38 (which is diagrammatically indicated in FIG. 1) interconnects the valve 37 with brake actuating chamber 34 and connects with a further passageway (diagramatically indicated at 39) in the distributor member 17. Passageway 39 connects with clutch actuating chamber 30 via annular groove 40 in distributor member 17 and drilling 41 in the carrier 20.

As can be seen from FIG. 1, the planetary gear assembly housing 18 is secured within an outer tractor transmission housing 42. Solenoid operated valve 37 is provided with pressuried fluid from a pump, at a pressure of say 17 bar, at indicated diagramatically at 43. This pressurised fluid is either directed by valve 37 to the passage 38 and hence to the brake and clutch chambers 34 and 30 or alternatively is exhausted back into the housing 42 as diagramatically indicated at 44.

When the solenoid operated valve 37 is not supplying pressurised fluid to passage 38 brake 31 is engaged by spring number 36 and clutch 37 is released so that the planetary gear assembly operates in its planetary ratio. When pressurised fluid is supplied to passage 38 piston 33 displaces reaction number 35 against the action of spring 36 to disengage the brake 31 and pressurisation of clutch actuating chamber 30 engages the clutch 27 to lock the planet carrier 20 to the input shaft 12 via the torque transmitting member 24. This ensures that the planetary assembly operates in its direct drive ratio.

Figure 2:
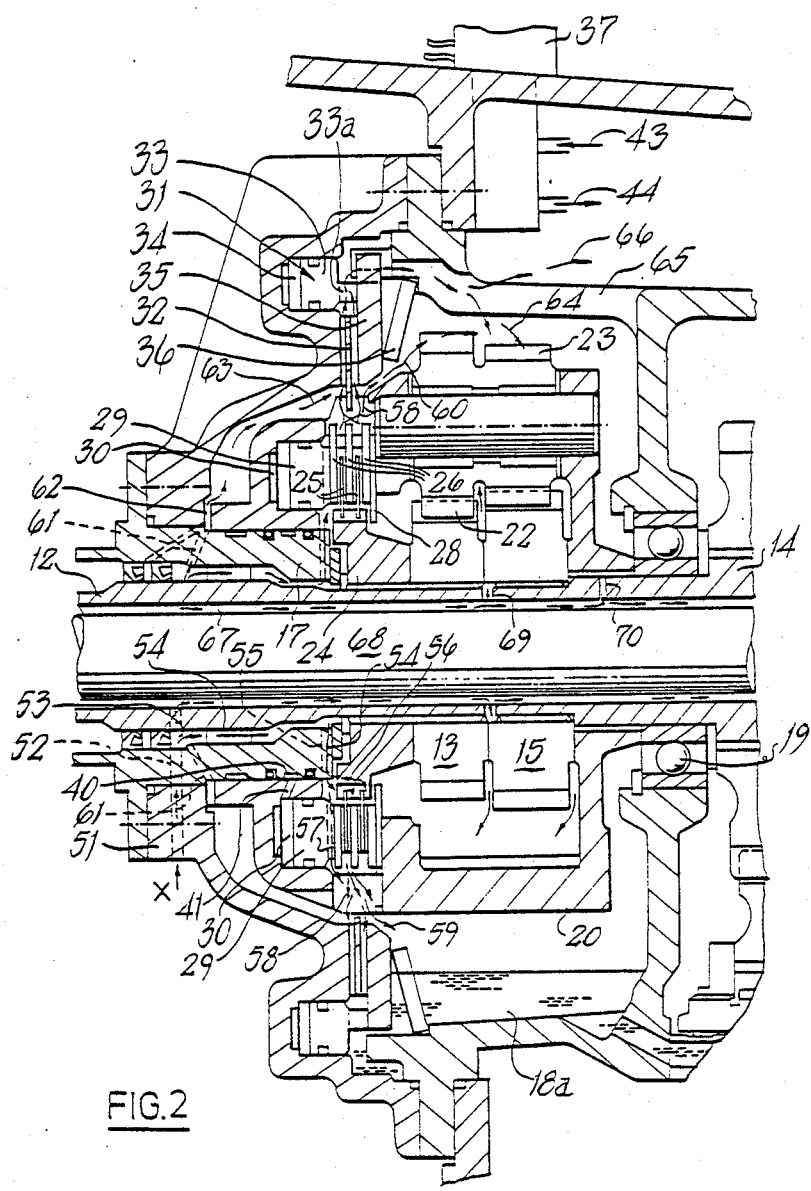
FIG. 2 shows part of FIG. 1 on a larger scale.

FIGS. 1 and 2 show sun gear 13 splined onto input shaft 12 and sun gear 15 splined onto output shaft 14. A mathematical analysis of the torque loading on clutch 27 will show that if the clutch operates between the input shaft and the carrier the torque loading is lower than if the clutch were to operate between the output shaft and the carrier. Thus the torque transmitting member 24 is preferably splined onto the input shaft rather than the output shaft although both alternatives are possible. Also, it is thought possible to eliminate torque transmitting member 24 in certain applications and to directly spline clutch discs 25 onto input shaft 12 or output shaft 14. This alternative is also within the scope of the present invention.

In a typical example sun gear 12 would have 36 teeth, planet gear 22 would have 21 teeth, planet gear 23 would have 18 teeth and sun gear 15 would have 39 teeth. This gives an overall planetary underdrive ratio of 0.7912.

Figure 3:
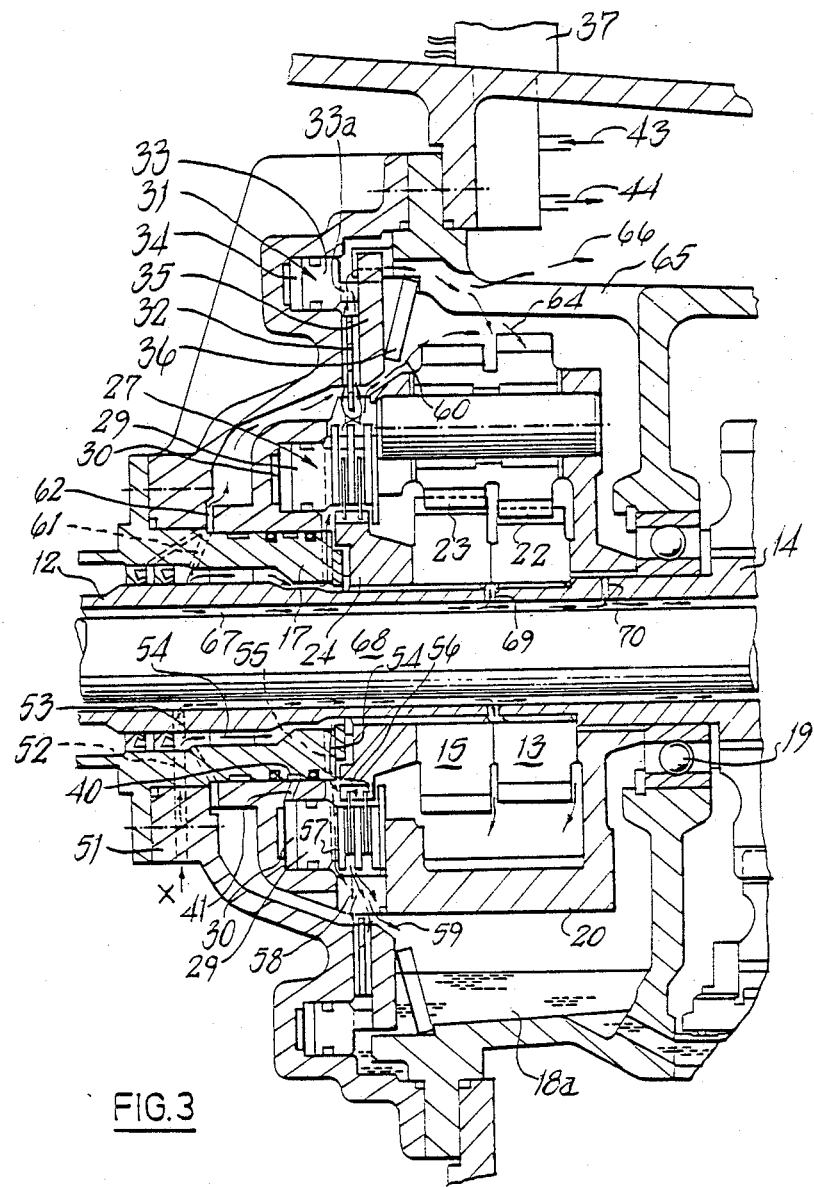
FIG. 3 shows part of FIG. 1 on a larger scale with the planetary gear assembly assembled to operate as an overdrive unit.

Input and output shafts 14 are arranged to have the same external diameter and the splined portions 12a and 14a of these shafts are arranged to have spline formations of the same cross-sectional form. This fact, in addition to the direct splining of the torque reaction number 24 onto one of the input or output shafts (which ensures that the torque path through the clutch does not pass through either sun gear) allows the position of sun gears 13 and 14 to be reversed as shown in FIG. 3. Thus with the sun gears 13 and 15 and the associated planet gears 21 reversed, the same planetary gear assembly components now provide a planetary overdrive ratio of 1.2639.

It will be appreciation that the above ability of the same gear components to provide two planetary gear assemblies one having an underdrive planetary ratio and the other having an overdrive planetary ratio gives significant savings in manufacturing and parts inventory costs.

Figure 4:
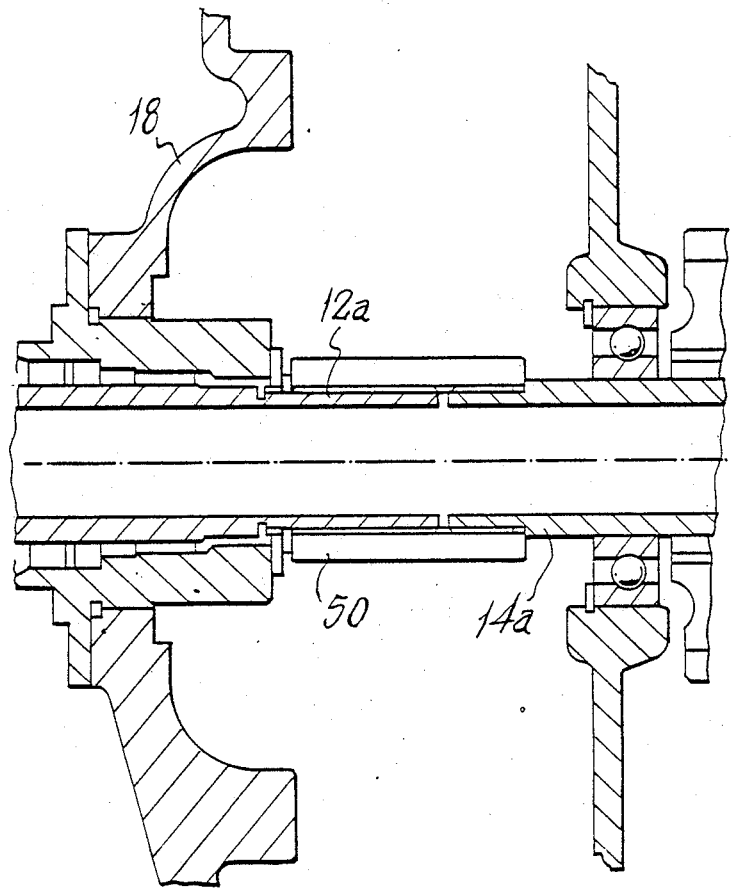
FIG. 4 shows, on a larger scale, how the planetary assembly of FIG. 1 can be deleted from the transmission.

Should it be desired to provide a transmission not having a planetary gear assembly this can be easily achieved using the simple arrangement shown in FIG. 4 in which an internally splined sleeve 50 is arranged to connect input shaft 12 and output shaft 14 thus providing a straight-through assembly. This simple ability to eliminate the planetary gear assembly can again provide significant production economies to the manufacturer.

The planetary gear assembly of the present invention also provides an efficient cooling system for the clutch 27 and brake 31. The coolant fluid is pressurised oil which is also used to cool and lubricate the change speed gear box 11. A flow of pressurised coolant at, say, 1.5 bar is supplied, as indicated by arrow X, to passageway 51 in the planetary gear assembly housing 18. This coolant flow is delivered via the passageway 52 in distributor member 17 to an annular passageway 53 defined between the distributor member 17 and the input shaft 12. A proportion of this coolant flow flows to the clutch 27 as indicated by arrows 54, reaching the clutch via radially extending grooves 55 cut-in the end of distributor member 17. A proportion of the coolant crosses the clutch as indicated by arrows 56 between the interleaved plates. A further proportion crosses via slots 57 cut in the clutch actuating piston 29. On exiting from the radially outer periphery of the clutch a proportion of the coolant (see arrows 58) also crosses the brake 31 while other coolant either drains directly into the lower portion 18a of the housing (as indicated by arrow 59) or splashes over the gears of the planetary gear assembly before draining into portion 18a of the housing (as indicated by arrows 60).

Some of the coolant flow X which does not flow to the clutch and brake via the above described route flows down drillings 61 to lubricate a plane thrust bearing 62 and hence, as shown by arrows 63 flows to cool the brake 31. The fluid exiting from the outer periphery of the upper portion of the brake 31 may splash down over the gears of the gear assembly, as indicated by arrows 64, or may pass out of the housing 18 via opening 65 as shown by arrow 66. Any fluid exiting via opening 65 finds its way into the transmission sump 42a shown in FIG. 1.

The remaining coolant flow X from chamber 53 travels, to the right as viewed in FIG. 2, down an annular passageway 67 defined between the input and output shafts 12 and 14 and a central power takeoff shaft 58. No flow occurs down passageways 67 to the left as a seal (not shown) is provided between shafts 12 and 68 to the left of chamber 53. Various radially extending gaps or drillings are provided to allow the flow down annular passage 67 to lubricate contacting side faces of adjacent gear members or to lubricate support bearings. For example, gap 69 allows lubrication of the contacting surfaces of sun gears 13 and 15 while radial drilling 70 allows lubrication of a support bearing 19 for the carrier 20.

As can be seen from FIG. 1, the coolant/lubricant which collects in the lower portion 18a of housing 18 is relayed via a spring-loaded connector 72 with an axial boring 73 in the lower shaft 74 of change speed gear box 11. This extends the cooling/lubricating system to, for example, the support bearings 75 and 76 of the change speed transmission.

It will be appreciated that the present invention provides a planetary gear asembley which, dependent on the manner in which the parts are assembled, can function as an overdrive or underdrive unit with consequent economies in manufacturing and parts inventory costs.

What is claimed is:

1. A planetary gear assembly (10) comprising co-axial input and output shafts (12,14) first and second sun gears (13,15) splined one onto each adjacent shaft end portion (12a,14a), a carrier (20) rotatable about the axis of the input and output shafts, planet gear means (22,23) carried by the carrier and meshing with the first and second sun gears respectively, a stationery housing (18), brake means (31) operable to hold the carrier stationery so that the assembly operates in its planetary ratio, and cluch means (27) operable to lock-up the assembly and provide a direct drive ratio, the assembly being characterised in that the adjacent end portions (12a,14a) of the input and output shafts (12,14) have the same diameter and spline formations of the same cross-sectional form, in that the clutch means (27) is operable to clutch one of the shafts (12) to the carrier (20) via a torque path (24) not involving either sun gear to lock up the assembly, and in that either sun gear (13,15) can be engaged with either the input or output shaft splined end portion and the meshing planet gear means (22,23) can be located accordingly so that a given gear assembly can be assembled to give either an overdrive or underdrive planetry ratio.

2. A planetary gear assembly according to claim 1 characterised in that the torque path includes a torque transmitting member (24) which is splined onto the input shaft end portion (12a).

* * * * *